(12) United States Patent
Pyros

(10) Patent No.: US 10,030,447 B2
(45) Date of Patent: Jul. 24, 2018

(54) SUPPORT PLATFORM ASSEMBLY

(71) Applicant: Philip Michael Pyros, Barrie (CA)

(72) Inventor: Philip Michael Pyros, Barrie (CA)

(73) Assignee: Philip Michael Pyros, Barrie, Ontario (CA)

( * ) Notice: Subject to any disclaimer, the term of this patent is extended or adjusted under 35 U.S.C. 154(b) by 0 days.

(21) Appl. No.: 15/139,488

(22) Filed: Apr. 27, 2016

(65) Prior Publication Data
US 2017/0314329 A1    Nov. 2, 2017

(51) Int. Cl.
| E06C 7/44 | (2006.01) |
| E04G 1/15 | (2006.01) |
| E04G 1/18 | (2006.01) |
| F16M 11/38 | (2006.01) |

(52) U.S. Cl.
CPC .............. *E06C 7/44* (2013.01); *E04G 1/18* (2013.01); *F16M 11/38* (2013.01); *E04G 2001/157* (2013.01)

(58) Field of Classification Search
CPC .... E04G 1/15; E04G 1/18; E04G 1/20; E04G 1/22; E04G 1/28; E04G 1/30; E04G 1/32; E04G 2001/157; E04G 2001/302; E04G 2001/305; E04G 2001/307; E06C 7/426; E06C 7/44; A47C 11/00
USPC ...... 182/56, 116, 123, 130, 131, 186.6, 200, 182/222, 223; 248/188.2, 118.5, 188.6, 248/188.8, 419, 163.1, 165, 166, 167, 248/436, 439; 297/452.6; 108/69, 83, 108/86, 93, 137, 143; D25/66; 211/195, 211/198, 200, 201, 149, 175
See application file for complete search history.

(56) References Cited

U.S. PATENT DOCUMENTS

| 979,220 | A | * | 12/1910 | Taber | .................. | E04G 1/22 |
| | | | | | | 182/101 |
| 1,057,722 | A | * | 4/1913 | Goetz | ................ | E06C 7/426 |
| | | | | | | 108/13 |
| 1,063,642 | A | * | 6/1913 | Birdsall | .............. | A47B 1/08 |
| | | | | | | 108/132 |
| 2,406,237 | A | * | 8/1946 | Milkoff | ............... | A47B 3/10 |
| | | | | | | 108/35 |

(Continued)

OTHER PUBLICATIONS

PCT, Written Opinion of the International Searching Authority and International Search Report, relating to application No. PCT/CA2017/050515, dated Aug. 1, 2017.

*Primary Examiner* — Jonathan Liu
*Assistant Examiner* — Guang H Guan
(74) *Attorney, Agent, or Firm* — Rowand LLP

(57) ABSTRACT

A support platform assembly is disclosed. The support platform assembly provides a level surface on which a ladder can be supported, and includes an extendable platform, a first set of legs and a second set of legs. The extendable platform includes a first plate having a flat top surface and a second plate having a flat top surface, the second plate being slidable relative to the first plate between a retracted position and an extended position such that a length of the platform increases as the second plate slides from the retracted position to the extended position. The first set of legs are pivotably coupled to a bottom surface of the first plate, and the second set of legs are pivotably coupled to a bottom surface of the second plate, the first and second sets of legs being configured to vertically support the platform.

16 Claims, 5 Drawing Sheets

(56) References Cited

U.S. PATENT DOCUMENTS

| | | | | |
|---|---|---|---|---|
| 2,508,627 A * | 5/1950 | Spiegel | A47B 3/0912 | |
| | | | 108/19 | |
| 2,696,246 A * | 12/1954 | Putnam | B60N 2/2854 | |
| | | | 108/129 | |
| 2,735,702 A * | 2/1956 | Larson | A47B 3/0818 | |
| | | | 108/125 | |
| 3,250,344 A * | 5/1966 | Romano | E04G 1/30 | |
| | | | 182/118 | |
| 3,491,706 A * | 1/1970 | Glass | A47B 3/0812 | |
| | | | 108/125 | |
| 3,556,254 A * | 1/1971 | Lambert | E04G 5/08 | |
| | | | 182/223 | |
| 4,286,525 A * | 9/1981 | Willmore | A47B 1/08 | |
| | | | 108/102 | |
| 4,392,437 A * | 7/1983 | Wallace | A47B 3/00 | |
| | | | 108/129 | |
| 4,457,397 A | 7/1984 | Scala | | |
| 4,494,465 A * | 1/1985 | Fick, Jr. | A47B 3/083 | |
| | | | 108/131 | |
| 4,909,159 A * | 3/1990 | Gonsoulin | A47B 23/04 | |
| | | | 108/143 | |
| 5,540,158 A * | 7/1996 | Ford | A47B 3/08 | |
| | | | 108/115 | |
| 5,715,910 A | 2/1998 | Koch et al. | | |
| 5,746,288 A * | 5/1998 | O'Neal | E04G 1/34 | |
| | | | 182/118 | |
| 5,967,261 A | 10/1999 | Sandham et al. | | |
| 5,996,666 A * | 12/1999 | Denina | E04F 10/10 | |
| | | | 160/202 | |
| 6,125,772 A * | 10/2000 | Clements | B60N 3/002 | |
| | | | 108/115 | |
| 6,289,824 B1 | 9/2001 | Parker et al. | | |
| 6,547,036 B1 | 4/2003 | Carter | | |
| 7,162,760 B2 | 1/2007 | Schweitzer | | |
| 7,686,134 B1 | 3/2010 | Harris | | |
| D621,959 S | 8/2010 | Klocker | | |
| 7,845,119 B2 * | 12/2010 | Black | E04G 1/36 | |
| | | | 52/127.2 | |
| 7,966,950 B2 * | 6/2011 | Volpe, Jr. | B60N 3/002 | |
| | | | 108/115 | |
| 8,042,653 B2 * | 10/2011 | Grebinoski | E04G 1/15 | |
| | | | 182/223 | |
| 8,113,316 B2 * | 2/2012 | Sward | G01N 33/497 | |
| | | | 108/62 | |
| 8,186,480 B1 * | 5/2012 | Yoakum, Jr. | E06C 1/39 | |
| | | | 182/118 | |
| 8,209,802 B2 * | 7/2012 | Linares | A61G 1/013 | |
| | | | 108/129 | |
| 8,465,100 B2 * | 6/2013 | Kim | A47C 16/025 | |
| | | | 297/423.41 | |
| 8,567,560 B1 * | 10/2013 | Rodriguez | E04G 3/22 | |
| | | | 182/223 | |
| 2008/0003542 A1 | 1/2008 | Jin et al. | | |
| 2012/0023462 A1 | 1/2012 | Rosing et al. | | |
| 2017/0314329 A1 * | 11/2017 | Pyros | E06C 7/44 | |

* cited by examiner

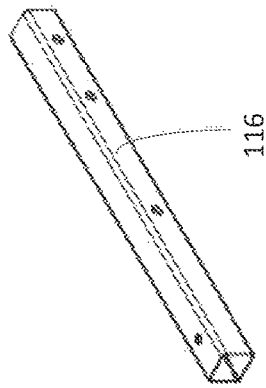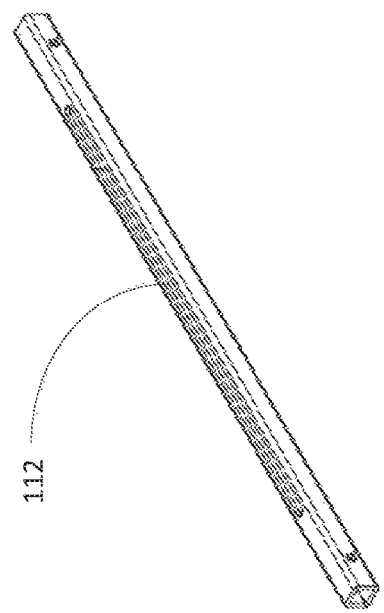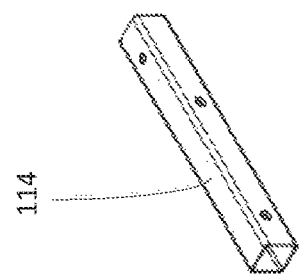
FIG. 4

SUPPORT PLATFORM ASSEMBLY

TECHNICAL FIELD

The present disclosure relates to a support structure and, in particular, to a support platform providing a level surface for objects supported by the platform.

BACKGROUND

Repair and maintenance tasks may be performed in a wide range of environments. Such tasks often require level working surfaces to accommodate stepping or climbing actions or placement of various equipment. Uneven or inclined surfaces, such as hilly or rugged terrain, ledges or indoor stairs, can make it difficult to access certain areas of a workspace or to establish stable footings for equipment in performing a task. For example, a ladder is often not suitable for use in a staircase or on a sloped rooftop, as varying elevations can frustrate attempts to securely position a ladder to access surrounding walls and ceiling. Painting and other tasks may be complicated in such environments.

Various devices designed to provide level working surfaces are known in the prior art. For example, accessories for levelling and stabilizing the legs of a ladder as well as devices for providing a platform to support a ladder are sometimes used. Many of these existing products are limited in application or are not suitably portable.

BRIEF DESCRIPTION OF DRAWINGS

Reference will now be made, by way of example, to the accompanying drawings which show example embodiments of the present application and in which:

FIG. 4 is a perspective view of parts of the sliding mechanism of the support platform assembly of FIG. 1.

Like reference numerals are used in the drawings to denote like elements and features.

DETAILED DESCRIPTION OF EXAMPLE EMBODIMENTS

In one aspect, the present disclosure describes a support platform assembly for providing a level surface on which a ladder can be supported. The support platform assembly includes an extendable platform. The extendable platform includes a first plate having a flat top surface and a second plate having a flat top surface. The second plate is slidable relative to the first plate between a retracted position and an extended position such that a length of the platform increases as the second plate slides from the retracted position to the extended position. The support platform assembly also includes a first set of legs pivotably coupled to a bottom surface of the first plate and a second set of legs pivotably coupled to a bottom surface of the second plate. The first and second sets of legs are configured to vertically support the platform.

Other example embodiments of the present disclosure will be apparent to those of ordinary skill in the art from a review of the following detailed descriptions in conjunction with the drawings.

The embodiments of the present application described below are directed to a device which provides a level working surface in various different settings. The device may facilitate secure positioning of equipment, such as a ladder, or other articles and provide a platform for stable footing when reaching elevated areas. The device is also portable, as it may be carried around by a user to different locations, and allows for flexible placement and positioning to accommodate the user's needs or requirements of a working environment.

Figure 1:
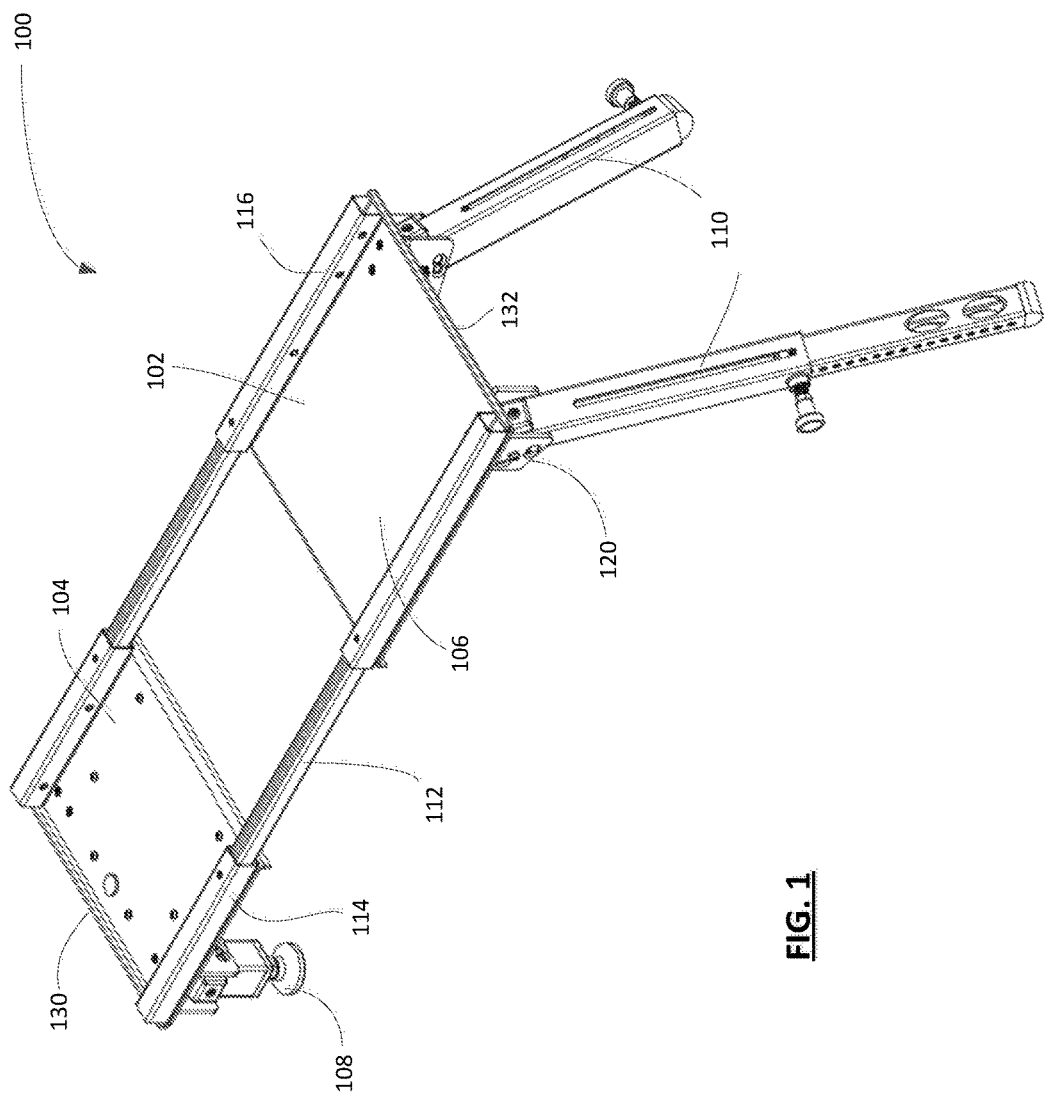
FIG. 1 is a perspective view of an example support platform assembly in accordance with example embodiments of the present disclosure.

Reference is first made to FIG. 1, which shows an example support platform assembly 100. As will be apparent from its description, the support platform assembly 100 provides a level surface on which a person or an object can be supported. The support platform assembly 100 includes a platform 102. The platform 102 may be constructed of a durable material, such as aluminum or wood, and is capable of supporting a large amount of weight without significant deformation. For example, the platform 102 may be constructed such that its thickness is greater than a threshold value at all points along the platform 102.

The top surface of the platform 102 is the surface which receives persons or objects to be supported by the support platform assembly 100. In at least some embodiments, the top surface of the platform 102 is generally planar, providing a level and continuous support surface. In particular, the top surface of the platform 102 does not define any holes or gaps that may prevent effective support for persons or objects on the support platform assembly 100.

As shown in the example of FIG. 1, the platform 102 defines a first end 130 and an opposite second end 132. The first end 130 and the second end 132 represent longitudinal ends of the platform 102. The platform 102 is extendable in length. That is, the distance between the first end 130 and the second end 132 of the platform 102 can be varied. More specifically, using a sliding mechanism, which will be explained in greater detail below, the platform 102 may be caused to extend beyond its original length along at least one direction. When the platform 102 is extended, the available surface area of the top surface of the platform 102 increases, which, in turn, increases the support capacity of the platform 102. In at least some embodiments, the platform 102 may be elongate, in either its original length or extended length, or both.

The platform 102 includes a first plate 104 and a second plate 106. Each of the first plate 104 and second plate 106 may comprise a single panel or layers of two or more panels. In at least some embodiments, the first plate 104 includes a top panel 202 (not shown in FIG. 1) and a bottom panel. The top panel 202 is fixedly secured to the top of the bottom panel 204 such that at least a portion of the top panel 202 is supported by the bottom panel 204. The top panel 202 may have a different shape than the bottom panel 204. For example, the top panel 202 may be longer than the bottom panel 204 such that when the top panel 202 is mounted on the top of the bottom panel 204, at least a portion of the top panel 202 extends beyond one or more of the edges of the bottom panel 204.

In the example shown in FIG. 1, the plates 104 and 106 are shown as being rectangular; however, other shapes for the plates may also be suitable. The first plate 104 and second plate 106 together provide at least part of the support surface of the platform 102. In particular, each of the plates 104 and 106 has a flat top surface, and the level surface of the platform 102 comprises one or both of the top surfaces of the plates 104 and 106. In the example of FIG. 1, the first plate 104 and second plate 106 are both generally planar and horizontally aligned with each other. More generally, in at least some embodiments, the top surfaces of the plates 104 and 106 may be so aligned as to form a continuous, smooth surface for the platform 102 when the platform 102 is extended beyond its original length.

The platform 102 can be extended by using a sliding mechanism for the plates 104 and 106. More specifically, the second plate 106 is configured to be horizontally slidable relative to the first plate 104. The second plate 106 is slidable between a retracted position and an extended position. In the retracted position, the second plate 106 is in such relative position to the first plate 104 that the platform 102 remains at its original, unaltered length. In particular, the retracted position represents a position in which the first end 130 and the second end 132 of the platform 102 are closest together. As the second plate 106 slides from the retracted position to the extended position, the second plate 106 is caused to move away from the first plate 104 and the length of the platform 102 increases. That is, a sliding movement of the second plate 106 away from the first plate 104 causes the platform 102 to be extended. Conversely, when the second plate 106 slides from the extended position to the retracted position, the second plate 106 is caused to move towards the first plate 104 and the length of the platform 102 decreases.

It will be understood that the relative sliding movement of the plates 104 and 106 can also be effected when the first plate 104 slides away from or towards the second plate 106. That is, the first plate 104 may be configured to slide relative to the second plate 106, causing the length of the platform 102 to be changed as the first plate 104 slides between the retracted position and the extended position. It will be apparent from the following description that the sliding mechanism of the support platform assembly 100 facilitates both the sliding movement of the first plate 104 and the sliding movement of the second plate 106. Without loss of generality, the following description will refer to the sliding movement of the second plate 106 relative to the first plate 104 in describing the sliding mechanism of the support platform assembly 100.

When the platform 102 is extended by sliding movement of the plates 104 and/or 106, the support platform assembly 100 can provide a larger surface area for supporting persons or objects. Furthermore, the capacity to extend the platform 102 to different lengths may allow the support platform assembly 100 to accommodate structural features of a work site. For example, when installing the support platform assembly 100 on steps for use in a staircase, the variability of length of the platform 102 may help to ensure that the platform 102 is stably positioned and supported by the legs of the support platform assembly 100. In particular, the platform 102 may need to be extended to a certain length such that the legs of the support platform assembly 100 are properly positioned on the steps of the staircase to provide a level and stable surface. Flexibility in adjusting the length of the platform 102 may make the support platform assembly 100 suitable for use in a variety of work and task settings.

In at least some embodiments, the support platform assembly 100 includes a pair of first guide rails 114 and a pair of second guide rails 116. The first guide rails 114 are affixed to the top surface of the first plate 104 and the second guide rails 116 are affixed to the top surface of the second plate 106. In FIG. 1, the first guide rails 114 extend in spaced parallel relation to each other on the top surface of the first plate 104, and the second guide rails 116 extend in spaced parallel relation to each other on the top surface of the second plate 106. The support platform assembly 100 may also include a pair of track members 112. Each track member 112 is coupled to one of the first guide rails 114 and one of the second guide rails 116. A track member 112 is configured to act as a male slidable connector that can be received in a female guide rail. In particular, a track member 112 may engage one of the first guide rails 114 and an opposing second guide rail 116 such that a first end of the track member 112 is received in the first guide rail 114 and a second end of the track member 112 is received in the opposing second guide rail 116. A track member 112 provides a connection between a first guide rail 114 and an opposing second guide rail 116 such that at least one of the first guide rail 114 and the opposing second guide rail 116 may be slidably mounted on the track member 112. In this way, the track members 112 allow directed sliding movement of the second plate 106 relative to the first plate 104, and vice versa. As shown in FIG. 1, the first guide rails 114 and opposing second guide rails 116 are generally aligned with the track members 112.

The first guide rails 114, the second guide rails 116 and the track members 112 may also serve to prevent objects from slipping off of the platform 102. For example, the first guide rails 114 and the second guide rails 116 may be so arranged as to delimit side boundaries of the top surfaces of the first and second plates 104 and 106, respectively. These guide rails may then serve as stoppers which prevent objects (e.g. a ladder) that are mounted on top of the platform 102 from falling off the sides of the platform 102. That is, the guide rails may limit the movement of objects on the platform 102 such that the objects remain supported on the top surface of the platform 102.

The sliding mechanism of the support platform assembly 100 will be explained in greater detail below with reference to FIG. 4. It will be appreciated that the relative sliding movement of the plates 104 and 106 may be effected in various ways that are different from those described herein.

The support platform assembly 102 also includes a first set of legs 108 and a second set of legs 110. The first set of legs 108 are pivotably coupled to the bottom surface of the first plate 104, and the second set of legs 110 are pivotably coupled to the bottom surface of the second plate 106. As shown in FIG. 1, the first set of legs 108 and second set of legs 110 are configured to vertically support the platform 102. The legs of the first set 108 and second set 110 maintain a raised position of the platform 102 with respect to one or more surfaces beneath the support platform assembly 100. Flexibility of length and/or positioning of the legs may allow the support platform assembly 100 to be adapted for use in a wide range of applications and settings.

In at least some embodiments, one or more of the legs of the first set 108 and second set 110 is extendable. That is, the length of one or more of the legs can be varied. In the example shown in FIG. 1, both of the legs of the second set 110 are extendable and longer than either of the legs of the first set 108. The first set of legs 108 may also be extendable. In particular, the length of one or both of the first set of legs 108 may be adjusted independently of the length of one or both of the second set of legs 110. The structural features of a particular work site can pose a challenge to proper positioning of the support platform assembly 100 in order to perform a task. For example, variations in length and elevation of steps in a staircase may make it difficult to place a support platform assembly 100 on the staircase. By allowing for independent control of the length of the legs of the support platform assembly 100, the support platform assembly 100 can be adjusted to accommodate the structural details of different work sites. The length of one or more of the legs of the support platform assembly 100 can be adjusted to compensate for differences in elevation of the underlying surface (e.g. ground, steps of a staircase, etc.) to provide a level support structure.

As in the example of FIG. 1, the first set of legs 108 may have a different maximum length than the second set of legs 110. For example, the maximum length to which each of the second set of legs 110 can extend may be greater than the maximum length to which each of the first set of legs 108 can extend. In some embodiments, the minimum length of the second set of legs 110 may be greater than the maximum length of the first set of legs 108. That is, each of the second set of legs 110, at its original length, may be longer than either of the first set of legs 108 at their extended lengths.

The legs of the first set 108 and second set 110 are coupled to the bottom surfaces of the first plate 104 and second plate 106, respectively, via connector brackets 120. More specifically, the support platform assembly 100 includes a plurality of connector brackets 120, each connector bracket 120 being secured to the bottom surface of either the first plate 104 or the second plate 106. Each of the legs is connected to one of the plates by a corresponding connector bracket 120. In particular, each leg is pivotably coupled to a corresponding connector bracket 120 which, in turn, is secured to one of the plates 104 and 106.

Figure 2:
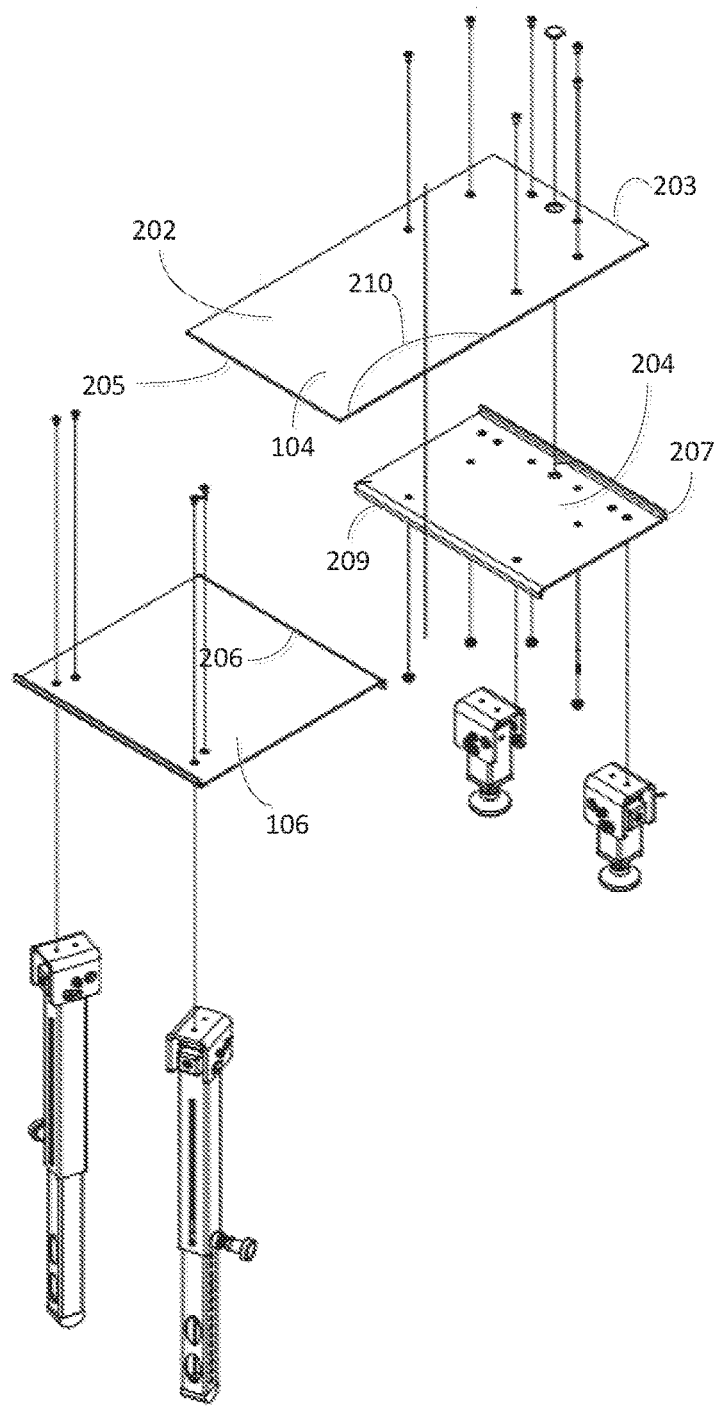
FIG. 2 is a partial exploded view of the support platform assembly of FIG. 1.

Reference is now made to FIG. 2, which shows a partial exploded view of the support platform assembly 100. To enhance readability, the first guide rails 114, the second guide rails 116 and the track members 112 have been removed. The first plate 104 includes a top panel 202 and a bottom panel 204. The top panel 202 is at least partially mounted on and affixed to the bottom panel 204. In FIG. 2, the top panel 202 is shown as being longer than the bottom panel 204. In particular, the distance between a first edge 203 and a second edge 205 of the top panel 202 is greater than the distance between a first edge 207 and a second edge 209 of the bottom panel 204. In at least some embodiments, the top panel 202 may be affixed to the bottom panel 204 such that at least a portion of the top panel 202 protrudes outward over an edge of the bottom panel 204. For example, in FIG. 2, when the top panel 202 is affixed to the bottom panel 204, the first edge 203 of the top panel 202 is aligned with the first edge 207 of the bottom panel, and a portion 210 of the top panel 202 extends past the second edge 209 of the bottom panel 204.

The portion 210 of the top panel 202 can be slidably mounted on top of the second plate 106 when the platform 102 is in the retracted position. In particular, the portion 210 of the top panel 202 may cover the entire top surface of the second plate 106 in the retracted position. In other words, the top panel 202 of the first plate 104 may form the entirety of the support surface of the platform 102 in the retracted position. As the second plate 106 slides away from the first plate 104, the portion 210 gradually slides off the top surface of the second plate 106, and the platform 102 is extended by the length of the portion 210 that is slid off. When the platform 102 is fully extended, the portion 210 may be removed entirely from, and thus not mounted on, the top surface of the second plate 106. Alternatively, the sliding movement of the second plate 106 may be limited such that the portion 210 is at least partially supported by the top surface of the second plate 106 in the extended position.

According to the configuration of the plates 104 and 106 in FIG. 2, a gap is defined between the second edge 209 of the bottom panel 204 and the first edge 206 of the second plate 106 as the second plate 106 slides relative to the first plate 104. In particular, the gap widens as the second plate 106 slides away from the first plate 104 and narrows as the second plate 106 slides towards the first plate 104. The portion 210 of the top panel 202 is configured to be a surface which covers this gap. In this way, a continuous, smooth surface may be provided for the platform 102 as the platform 102 switches between the retracted position and the extended position. For example, when the platform 102 is fully extended, the support surface of the platform 102 may be an aggregate of the top surface of the second plate 106 and the surface of the top panel 202 of the first plate 104.

It will be appreciated that various configurations of the plates 104 and 106 different from that which is depicted in FIG. 2 may also provide a continuous surface for the platform 102. By way of example, in some embodiments, the second plate 106, rather than the first plate 104, may include a top panel and a bottom panel. Similarly as in FIG. 2, a portion of the top panel of the second plate 106 which extends past an edge of the bottom panel may be configured to slidably mount on top of the first plate 104 and provide a covering surface for the gap between the bottom panel and the first plate 104 when the platform 102 extends or retracts.

Figure 3:
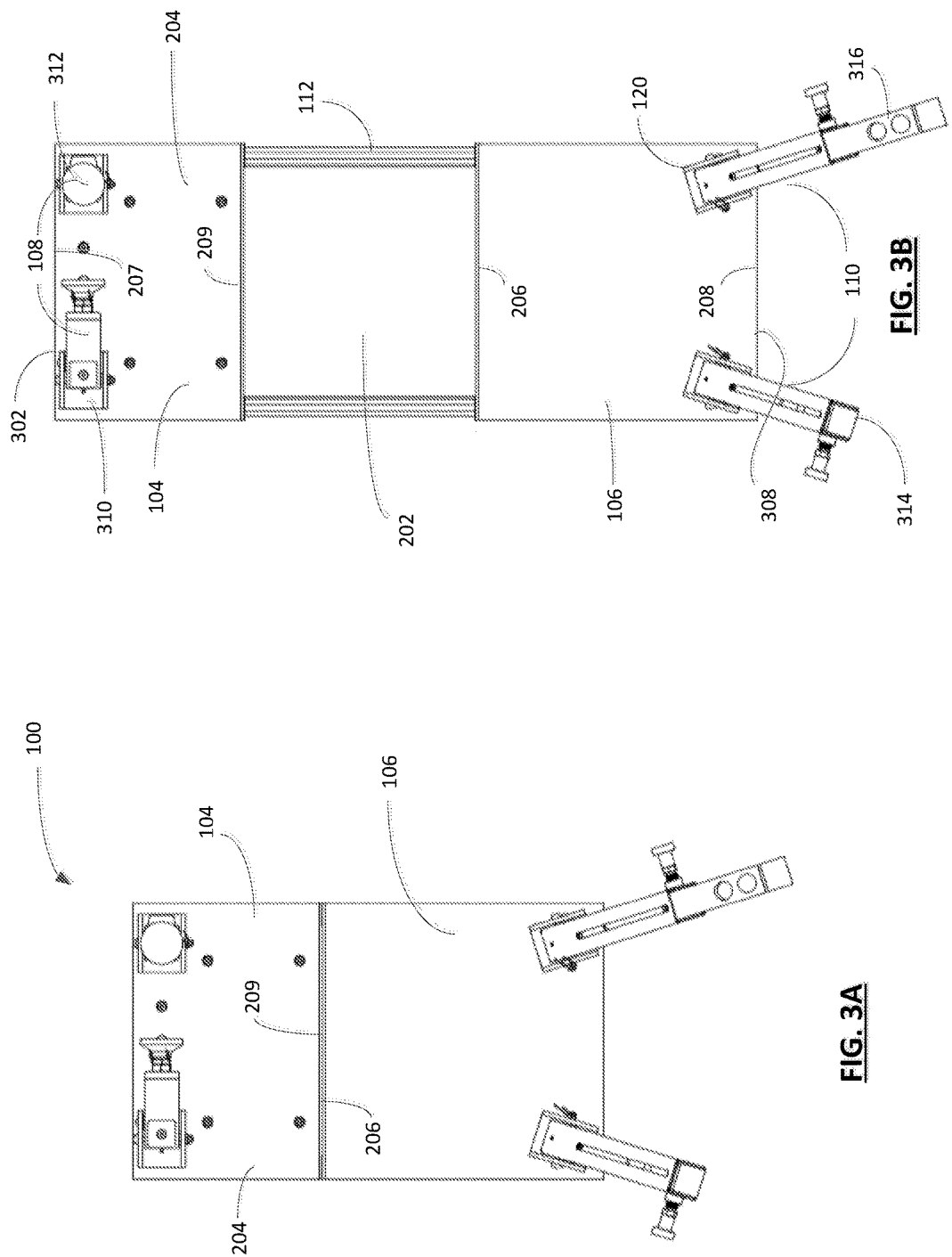
FIGS. 3A and 3B are bottom views of the support platform assembly of FIG. 1.

Reference is now made to FIGS. 3A and 3B, which show bottom views of the support platform assembly 100. In FIG. 3A, the platform 102 is in the retracted position. For example, FIG. 3A represents the support platform assembly 100 in its original form, with no extension of the platform 102. In the retracted position, the second edge 209 of the bottom panel 204 of the first plate 104 aligns with and abuts the first edge 206 of the second plate 106. In contrast, FIG. 3B shows the support platform assembly 100 when the platform 102 is in the extended position. The second plate 106 is configured to slide horizontally relative to the first plate 104, causing the second edge 209 of the bottom panel 204 to be separated from the first edge 206 of the second plate 106 by an increasing distance. The direction of sliding movement of the second plate 106 is determined by the track members 112. For example, the second plate 106 may slide linearly with respect to the first plate 104 along a direction of extension of the track members 112.

FIG. 3B shows the first set of legs 108 coupled to the bottom surface of the first plate 104 and the second set of legs 110 coupled to the bottom surface of the second plate 106. The first set of legs 108 are coupled at a first end 302 of the first plate 104 and the second set of legs 110 are coupled at a first end 308 of the second plate 106. More specifically, the connector brackets 120 corresponding to the first set of legs 108 are secured to the bottom panel 204 at the first end 302 of the first plate 104 and the connector brackets 120 corresponding to the second set of legs 110 are secured to the bottom surface of the second plate 106 at the first end 308.

In at least some embodiments, each of the first set of legs is pivotable between a folded position and a vertical position. In FIG. 3B, a first leg 310 of the first set of legs 108 is in the folded position and a second leg 312 is in the vertical position. When a leg is pivoted to the folded position, it is positioned parallel to the bottom surface of the first plate 104. In contrast, when a leg is pivoted to the vertical position, it extends generally perpendicular to the bottom surface of the first plate 104. In some embodiments, as shown in FIG. 3B, one or more of the first set of legs 108 may be foldable in a direction that is perpendicular to the lateral edges of the first plate 104. In other words, when a leg of the first set 108 is folded against the bottom surface of the first plate 104, it may be positioned to extend in a direction parallel to the first edge 207 of the bottom panel 204. Furthermore, each of the first set of legs 108 may fold towards the other of the first set of legs 108. For example, when the first leg 310 is in the folded position, the lower end of the first leg 310 is positioned closer to the second leg 312 than is the upper end of the first leg 310. Similarly, the lower end of the second leg 312 is positioned closer to the first leg 310 than is the upper end of the second leg 312 when the second leg 312 is folded against the bottom surface of the first plate 104.

FIG. 3B also shows the second set of legs 110. The leg 316 has been extended in length relative to the leg 314. Unlike the first set of legs 108, the second set of legs 110 are not positioned parallel to the lateral edges of the second plate 106. Instead, the connector brackets 120 corresponding to the second set of legs 110 are affixed to the bottom surface of the second plate 106 such that they are angled relative to both the lateral edges of the second plate 106 and the second edge 208 of the second plate 106. As a result, when the legs 314 and 316 are folded against the second plate 106, the legs 314 and 316 are positioned such that they extend generally diagonally along the bottom surface of the second plate 106.

In at least some embodiments, the connector brackets 120 are freely rotatable. In particular, a connector bracket 120 may be rotated relative to the bottom surface of the plate to which the connector bracket 120 is attached and fixedly secured in position. For example, a connector bracket 120 affixed to the second plate 106 can be rotated to a desired angle with respect to the edges of the second plate 106 and locked in position. Since each leg pivots relative to its corresponding connector bracket, by rotating a connector bracket to a desired position, the direction of rotation of the corresponding leg can be controlled. This flexibility in movement of the connector brackets and corresponding legs may facilitate stable positioning of the support platform assembly 100 in various different workspace settings. For example, increased freedom of movement of the legs of the support platform assembly 100 can make the legs better suited for propping up the platform 102 against surrounding surfaces and walls.

Reference is now made to FIG. 4, which shows a perspective view of the parts of the sliding mechanism of the support platform assembly 100. The first guide rail 114 may be affixed to the first plate 104 of FIG. 1 and the second guide rail 116 may be affixed to the second plate 106 of FIG. 1. Each of the guide rails 114 and 116 defines a hollow bore which extends between the two ends of the guide rail. In at least some embodiments, the track member 112 is sized to fit in the bores of guide rails 114 and 116. In particular, one or both of the guide rails 114 and 116 may be slidably supported by the track member 112. That is, the guide rails may be slidable with respect to the track member 112. The track member 112 has a greater length than each of the first guide rail 114 and second guide rail 116. In at least some embodiments, the length of the track member 112 may be generally equal to the sum of the lengths of the guide rails 114 and 116.

When the platform 102 is in the retracted position, the first guide rail 114 and second guide rail 116 are in close proximity to each other. For example, the guide rails 114 and 116 may be touching. As the platform 102 is extended, one or both of the guide rails 114 and 116 may slide relative to the track member 112 and the distance between the guide rails 114 and 116 increases. More specifically, in at least some embodiments, the first guide rail 114 may slide in a first direction with respect to the track member 112 and the second guide rail 116 may slide in a second direction opposite to the first direction with respect to the track member 112. Since the guide rails 114 and 116 are each affixed to their respective plates, sliding of the guide rails 114 and 116 causes movement of the first plate 104 and second plate 106, respectively, with respect to the track member 112.

The length of the platform 102 can be controlled by fixing the position of one or both of the guide rails 114 and 116 with respect to the track member 112. For example, the track member 112 may include one or more retractable locking pins on its exterior surface and the guide rails 114 and 116 may include a plurality of locking pin holes defined on their side walls. As one of the guide rails 114 and 116 slides relative to the track member 112, a locking pin of the track member 112 may engage and be retained in a locking pin hole on the guide rail, fixedly securing the guide rail in position with respect to the track member 112. Other mechanisms for fixing the relative positions of the guide rails and track member 112 may be available. In this way, the first plate 104 and second plate 106 can be locked in fixed relative position to each other, preventing unwanted extension or contraction of the platform 102 when the support platform assembly 100 is in use. The guide rails 114 and 116 and/or the track member 112 include features to ensure that a guide rail does not slide off an end of the track member 112. For example, the track member 112 may include one or more projections defined on its exterior that are designed to catch against the interior wall of a guide rail to prevent the guide rail from sliding past a certain point. In this way, the sliding mechanism can ensure that the first plate 104 and the second plate 106 remain connected by the track members 112 and that the second plate 106 does not slide entirely off of the platform 102 as the platform 102 is extended beyond its original length.

Figure 5:
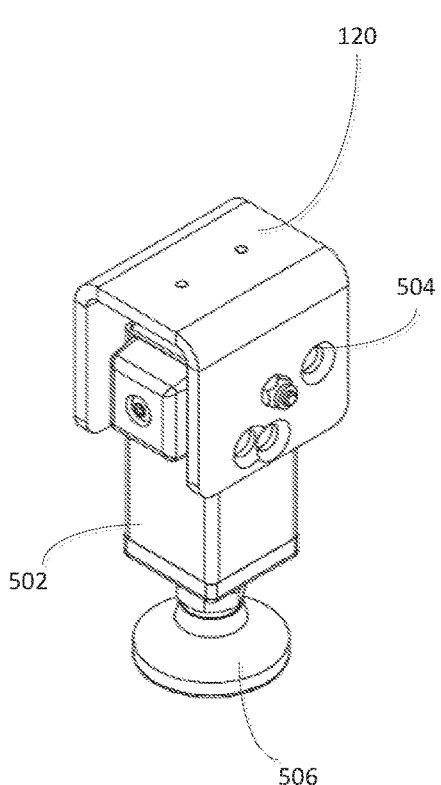
FIG. 5 is a perspective view of an example leg of a first set of legs of the support platform assembly of FIG. 1.

Reference is now made to FIG. 5, which shows an example leg 502 of the first set of legs 108 of FIG. 1 and an associated connector bracket 120. In at least some embodiments, the leg 502 includes a slip resistant bottom surface 506. For example, the leg 502 may be supported by a bottom cap made from a slip resistant material (e.g. rubber) or have a bottom surface which is rubberized.

Since the leg 502 is pivotable with respect to the connector bracket 120, a mechanism for fixing the leg in position may be provided such that the leg 502 can stably support the platform 102 of FIG. 1. In at least some embodiments, the connector bracket 120 defines a plurality of locking pin holes 504. These locking pin holes 504 can be used to fixedly secure a relative position of the leg 502. For example, as shown in FIG. 5, the leg 502 may include a locking pin that is configured to engage and be retained in one of the locking pin holes 504. When the locking pin is retained in the locking pin holes 504, the leg 502 is locked in position with respect to the connector bracket 120.

By defining the locking pin holes 504 at desired locations on the connector bracket 120, the rotating positions of the leg 502 can be controlled. In particular, the possible angles of rotation of the leg 502 with respect to the connector bracket 120 may be determined by the placement of the locking pin holes 504 on the connector bracket 120. For example, the locking pin holes 504 may be placed on the connector bracket 120 such that at least one hole corresponds to a folded position of the leg 502 and at least one hole corresponds to a vertical position of the leg 502. In at least some embodiments, at least one of the locking pin holes 504 may correspond to a terminal pivot position in which the leg 502 rotates past the vertical position of the leg 502. More specifically, a locking pin hole 504 may be associated with a pivot position which defines an angle of rotation from the folded position of the leg 502 that is greater than an angle of rotation associated with the vertical position of the leg 502. The spacing and location of the locking pin holes 504 on the connector bracket 120 determine the fixed support positions of the leg 502.

Figure 6:
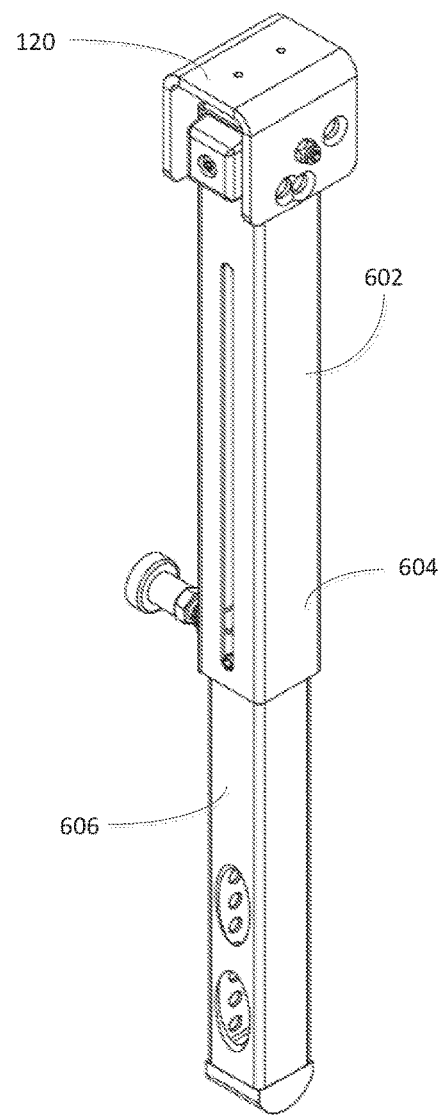
FIG. 6 is a perspective view of an example leg of a second set of legs of the support platform assembly of FIG. 1.

Reference is now made to FIG. 6, which shows an example leg 602 of the second set of legs 110 of FIG. 1 and an associated connector bracket 120. The leg 602 includes an upper leg member 604 and a lower leg member 606 connected to the upper leg member 604. The upper leg member 604 is secured to the connector bracket 120 which may, in turn, be used to affix the leg 602 to the platform 102 of FIG. 1. One or both of the leg members 604 and 606 may be tube-shaped. For example, as shown in FIG. 6, the upper leg member 604 may define a cavity that is sized to receive at least a portion of the lower leg member 606. In at least some embodiments, the upper leg member 604 and the lower leg member 606 may be slidable relative to each other. For example, the lower leg member 606 may be configured to fit and slide inside a cavity in the upper leg member 604. The length of the leg 602 can be changed by sliding the lower leg member 606 with respect to the upper leg member 604. For example, as the lower leg member 606 is slid away from the upper leg member 604, the leg 602 may be extended. The length of the leg 602 can be fixed by securing the lower leg member 606 in position relative to the upper leg member 604. In some embodiments, a clamp mechanism may be used to allow adjustment of the leg length and to fasten the lower leg member 606 against the upper leg member 604.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A support platform assembly for providing a level surface, the support platform assembly comprising:
   an extendable platform including:
      a first plate having a flat top surface, a first end, a second end, and two lateral edges extending between the first end and the second end, the first plate including a bottom panel and a top panel at least partially mounted on the bottom panel, the bottom panel having a first edge and an opposite second edge, wherein the top panel is longer than the bottom panel and is affixed to the bottom panel such that a first portion of the top panel extends past the first edge of the bottom panel; and
      a second plate having a flat top surface, a first end, a second end, and two lateral edges extending between the first end and the second end, the second plate being slidable relative to the first plate between a retracted position and an extended position such that a length of the platform increases as the second plate slides from the retracted position to the extended position, wherein the second plate is longer than the bottom panel of the first plate and wherein the first portion of the top panel is slidably mounted on top of the second plate to cover the top surface of the second plate in the retracted position;
   a first set of legs pivotably coupled to a bottom surface of the first plate, each of the first set of legs being independently foldable and configured to:
      be folded towards the bottom surface of the first plate and arranged substantially perpendicular to the lateral edges of the first plate in a folded position; and
      rotate from the folded position to a terminal pivot position past a vertical position, the vertical position corresponding to a position in which each of the first set of legs is generally perpendicular to the bottom surface of the first plate;
   a second set of legs pivotably coupled to a bottom surface of the second plate, each of the second set of legs being independently foldable and longer than a maximum length of any of the first set of legs and being configured to:
      be folded towards the bottom surface of the second plate and arranged non-perpendicular to the lateral edges of the second plate in a folded position; and
      rotate from the folded position to a terminal pivot position past a vertical position, the vertical position corresponding to a position in which each of the second set of legs is generally perpendicular to the bottom surface of the second plate
   wherein the first and second sets of legs are configured to vertically support the platform.

2. The support platform assembly of claim 1, wherein the second plate is slidable in horizontal alignment with the first plate.

3. The support platform assembly of claim 1, wherein the second plate is configured to be locked in a fixed relative position with respect to the first plate.

4. The support platform assembly of claim 1, further comprising a pair of track members coupled to the first plate, the track members extending longitudinally along the lateral edges of the first plate and the second plate.

5. The support platform assembly of claim 4, further comprising a pair of first guide rails affixed to the top surface of the first plate adjacent to the lateral edges of the first plate, the pair of first guide rails being slidably supported on the pair of track members.

6. The support platform assembly of claim 5, further comprising a pair of second guide rails affixed to the top surface of the second plate adjacent to the lateral edges of the second plate, the pair of second guide rails being slidably supported on the pair of track members.

7. The support platform assembly of claim 1, wherein at least part of the first portion of the top panel is not mounted on top of the second plate in the extended position.

8. The support platform assembly of claim 1, wherein at least one of the first set of legs is pivotable between the folded position and the vertical position, the at least one of the first set of legs being parallel to the bottom surface of the first plate in the folded position.

9. The support platform assembly of claim 8, wherein the terminal pivot position of the at least one of the first set of legs defines an angle of rotation from the folded position that is greater than an angle of rotation associated with the vertical position.

10. The support platform assembly of claim 1, wherein at least one of the first set of legs is coupled to a first end of the bottom surface of the first plate which is furthest from the second plate.

11. The support platform assembly of claim 1, wherein at least one of the second set of legs is pivotable between the folded position and the vertical position, the at least one of the second set of legs being parallel to the bottom surface of the second plate in the folded position.

12. The support platform assembly of claim 11, wherein the terminal pivot position of the at least one of the second set of legs defines an angle of rotation from the folded position that is greater than an angle of rotation associated with the vertical position.

13. The support platform assembly of claim 1, wherein at least one of the second set of legs is coupled to a first end of the bottom surface of the second plate which is furthest from the first plate.

14. The support platform assembly of claim 1, wherein at least one of the first and second sets of legs is extendable.

15. The support platform assembly of claim 1, wherein each of the first and second sets of legs comprises a slip resistant bottom surface.

16. The support platform assembly of claim 1, further comprising, a plurality of first connector brackets secured to the bottom surface of the first plate and a plurality of second connector brackets secured to the bottom surface of the second plate, wherein each of the first set of legs is pivotably coupled to a respective one of the first connector brackets and each of the second set of legs is pivotably coupled to a respective one of the second connector brackets.

* * * * *